(12) United States Patent
Bruzzone et al.

(10) Patent No.: US 8,119,936 B2
(45) Date of Patent: Feb. 21, 2012

(54) MOUNTING SYSTEM WITH MEASUREMENT OF THE WEIGHT OF THE OCCUPANT FOR A SEAT OF A MOTOR VEHICLE

(75) Inventors: Michela Bruzzone, Formigine (IT); Elmar Konstanzer, Hechingen (DE); Giovanni Stefani, Sassuolo (IT); Mauro Del Monte, Modena (IT)

(73) Assignee: Ferrari S.p.A., Modena (IT)

( * ) Notice: Subject to any disclaimer, the term of this patent is extended or adjusted under 35 U.S.C. 154(b) by 574 days.

(21) Appl. No.: 11/918,548

(22) PCT Filed: Apr. 14, 2006

(86) PCT No.: PCT/IB2006/000892
§ 371 (c)(1),
(2), (4) Date: May 27, 2009

(87) PCT Pub. No.: WO2006/109166
PCT Pub. Date: Oct. 19, 2006

(65) Prior Publication Data
US 2009/0294185 A1 Dec. 3, 2009

(30) Foreign Application Priority Data
Apr. 15, 2005 (IT) .............................. BO2005A0244

(51) Int. Cl.
*B60R 21/015* (2006.01)
*G01G 19/52* (2006.01)
*G01G 19/12* (2006.01)

(52) U.S. Cl. ......... 177/136; 73/117.01; 73/760; 73/763; 73/768; 73/856; 177/144; 177/DIG. 9; 180/273; 280/735

(58) Field of Classification Search ................... 177/136, 177/144, DIG. 9; 180/273; 280/735; 73/117.01, 73/760, 763, 768, 856
See application file for complete search history.

(56) References Cited

U.S. PATENT DOCUMENTS
2,789,457 A * 4/1957 Allen .............................. 411/432
(Continued)

FOREIGN PATENT DOCUMENTS
DE 3545337 7/1987
(Continued)

OTHER PUBLICATIONS
European Search Report mailed Jul. 16, 2009 in EP Appln. No. 09159212.1.

*Primary Examiner* — Randy W Gibson
(74) *Attorney, Agent, or Firm* — Davidson Berquist Jackson & Gowdey, LLP

(57) ABSTRACT

Described herein is a mounting system with measurement of the weight of the occupant for a seat of a motor vehicle; the mounting system has a bottom frame rigidly connected to the bodywork of the motor vehicle, a top frame, which supports the seat and is mounted in a floating way on the bottom frame, and a plurality of weight sensors, each of which is set between the bottom frame and the top frame and is connected to the bottom frame or to the top frame by means of a single bolt integrated in the weight sensor itself and locked by a nut; a surface of the nut facing the weight sensor has a spherical shape, and set between the nut and the frame is a washer having a spherical central surface, which reproduces in negative form the shape of the corresponding spherical surface of the nut.

30 Claims, 6 Drawing Sheets

U.S. PATENT DOCUMENTS

| | | | |
|---|---|---|---|
| 3,444,943 A * | 5/1969 | Tytus | 177/180 |
| 3,524,413 A * | 8/1970 | Veasman | 410/111 |
| 3,980,148 A * | 9/1976 | Von Drygalski | 177/132 |
| 4,411,325 A * | 10/1983 | Hamilton | 177/136 |
| 4,411,327 A * | 10/1983 | Lockery et al. | 177/211 |
| 4,692,055 A * | 9/1987 | Seymour | 403/190 |
| 4,765,423 A * | 8/1988 | Karpa | 177/211 |
| 4,804,053 A * | 2/1989 | Nordstrom | 177/211 |
| 5,199,838 A * | 4/1993 | Luke et al. | 411/140 |
| 5,327,989 A | 7/1994 | Furuhashi et al. | |
| 5,600,104 A * | 2/1997 | McCauley et al. | 177/136 |
| 5,801,339 A * | 9/1998 | Boult | 177/261 |
| 5,887,485 A | 3/1999 | VanOrder et al. | |
| 6,087,598 A * | 7/2000 | Munch | 177/144 |
| 6,218,632 B1 | 4/2001 | McCarthy et al. | 177/144 |
| 6,320,142 B1 * | 11/2001 | Burton et al. | 177/132 |
| 6,397,688 B1 * | 6/2002 | Sakamoto et al. | 73/862.637 |
| 6,407,347 B1 | 6/2002 | Blakesley | 177/144 |
| 6,433,289 B1 * | 8/2002 | Gurr | 177/238 |
| 6,520,023 B2 * | 2/2003 | Kimura | 73/795 |
| 6,640,653 B1 * | 11/2003 | Ishida | 73/862.627 |
| 6,695,379 B1 * | 2/2004 | Ishida | 296/65.14 |
| 6,835,899 B2 * | 12/2004 | Wolfe et al. | 177/144 |
| 6,841,741 B2 * | 1/2005 | Kajiyama | 177/144 |
| 6,916,997 B2 * | 7/2005 | Thakur et al. | 177/136 |
| 6,931,947 B2 * | 8/2005 | Schulze et al. | 73/862.381 |
| 6,969,809 B2 * | 11/2005 | Rainey | 177/136 |
| 7,038,146 B2 * | 5/2006 | Saito et al. | 177/136 |
| 7,112,749 B2 * | 9/2006 | DiPaola et al. | 177/136 |
| 7,117,756 B2 * | 10/2006 | Rybak et al. | 73/862.474 |
| 7,189,931 B2 * | 3/2007 | Hida et al. | 177/144 |
| 7,210,358 B2 * | 5/2007 | Yamazaki | 73/761 |
| 7,297,880 B2 * | 11/2007 | Sulkowski et al. | 177/144 |
| 7,365,278 B2 * | 4/2008 | Sallam et al. | 200/85 R |
| 7,373,846 B2 * | 5/2008 | Furukawa et al. | 73/862.621 |
| 7,402,763 B2 * | 7/2008 | Menke et al. | 177/144 |
| 7,405,370 B2 * | 7/2008 | Sallam et al. | 200/85 R |
| 7,435,918 B2 * | 10/2008 | Becker et al. | 177/136 |
| 7,518,073 B2 * | 4/2009 | Sallam et al. | 200/85 A |
| 7,836,997 B2 * | 11/2010 | Takayasu et al. | 180/273 |
| 2005/0284668 A1 * | 12/2005 | Hida et al. | 177/136 |

FOREIGN PATENT DOCUMENTS

| | | |
|---|---|---|
| DE | 4243455 | 6/1994 |

* cited by examiner

MOUNTING SYSTEM WITH MEASUREMENT OF THE WEIGHT OF THE OCCUPANT FOR A SEAT OF A MOTOR VEHICLE

TECHNICAL FIELD

The present invention relates to a mounting system with measurement of the weight of the occupant for a seat of a motor vehicle.

BACKGROUND ART

A modern automobile is provided with numerous safety devices having the function of preserving the physical safety of the occupants in the event of accidents. One of the most widespread safety devices is the airbag, which comprises a flexible cushion that is inflated in very short times in the case of collision (detected by accelerometric sensors) thanks to a small explosive charge.

Some international standards envisage that an airbag set in a front position must not be activated when a baby is present on the front seat. For this reason, it is necessary to know whether a baby is present on the front seat. Said indication can be supplied in different ways, amongst which the most common is the presence of a switch that disables entry into action of the airbag and that is driven by means of a lock actuated by the starting key of the vehicle.

However, said solution is not deemed fully reliable in so far as it requires intervention of the driver, who must manually disable/re-activate triggering of the airbag. For this reason, alternative solutions have been proposed, amongst which we may recall use of proximity sensors to evaluate the "dimensions" of the passenger present on the seat, use of radiofrequency recognition systems (transponders or the like) for determining the presence of a cradle (which must be provided with a transponder or the like), or else use of weight sensors to determine the weight of the passenger present on the seat.

For example, the U.S. Pat. No. 6,366,200 describes a system designed to detect the weight of the passenger present on the seat by means of a set of weight sensors for determining whether the seat is empty, whether it is occupied by a baby, or else whether it is occupied by an adult; in particular, the seat is considered as being empty if the weight detected by the weight sensors is less than a first threshold value; the seat is considered as being occupied by an adult if the weight detected by the weight sensors is higher than a second threshold value; finally, the seat is considered as being occupied by a baby if the weight detected by the weight sensors is comprised between the first threshold value and the second threshold value.

In airbags currently available on the market, the internal pressure and volume of the inflated cushion are constant and determined a priori. Recently, a new generation of airbags (referred to as "smart airbags") has been proposed, which can be controlled so as to partialize inflation of the cushion and hence obtain a variable internal pressure and/or volume of the inflated cushion. In particular, the internal volume and/or pressure of the inflated cushion are/is varied as a function of the violence of the impact and/or as a function of the weight of the occupant of the seat and/or of other parameters, so as to adapt the characteristics of the cushion to the morphological characteristics of the occupant of the seat. An example of a "smart airbag" is provided by the U.S. Pat. No. 6,532,408.

From what has been set forth above, it is clear that it is necessary to provide a mounting system of the seat equipped with a device for measuring the weight of the occupant.

The documents U.S. Pat. No. 6,039,344, WO0100454 and EP142624 describe a mounting system with measurement of the weight of the occupant for a seat of a motor vehicle, in which a seat is slidably mounted on a slide guide, which is in turn supported by a top frame. The top frame is mounted in a floating way on a bottom frame rigidly connected to the bodywork of the motor vehicle by means of interposition of four weight sensors.

The known mounting systems with measurement of the weight of the occupant described above present the drawback of requiring a high constructional precision (i.e., very small constructional tolerances) for guaranteeing proper operation. Said high constructional precision inevitably entails long production times and high manufacturing costs.

U.S. Pat. No. 4,765,423 discloses an adaptor for load cells with through loading holes (primarily cylindrical or doughnut type) used in multiple cell applications (scales); it provides lateral stops and anti-tipping control for the associated load receptacles.

DISCLOSURE OF INVENTION

The aim of the present invention is to provide a mounting system with measurement of the weight of the occupant for a seat of a motor vehicle, said mounting system being simple to produce and of low cost and at the same time being free from the drawbacks described above.

In accordance with the present invention, a mounting system with measurement of the weight of the occupant for a seat of a motor vehicle is provided according to what is recited in the annexed claims.

BRIEF DESCRIPTION OF THE DRAWINGS

The present invention will now be described with reference to the annexed plate of drawings, which illustrate some non-limiting examples of embodiment thereof, and in which.

BEST MODE FOR CARRYING OUT THE INVENTION

Figure 1:
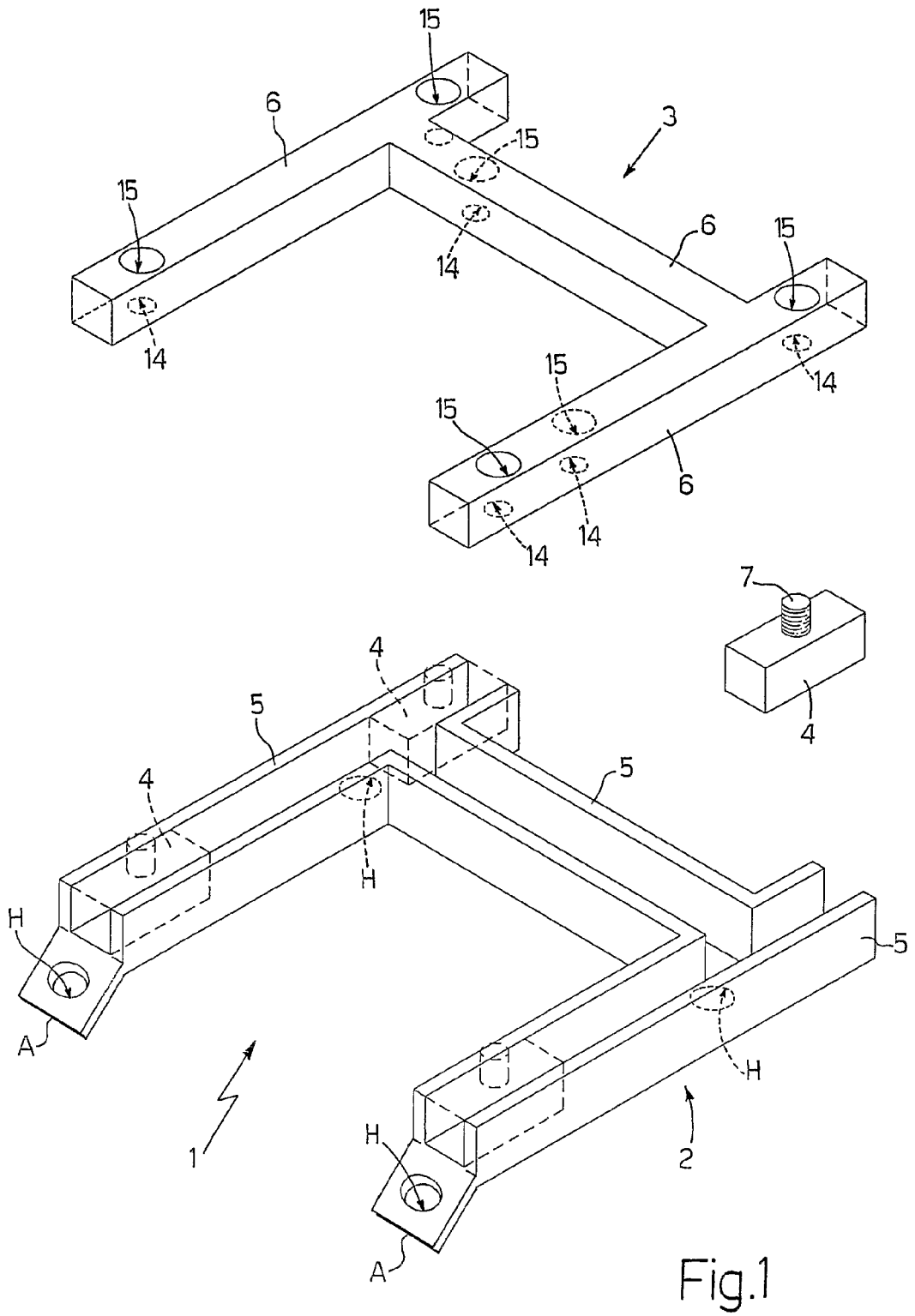
FIG. 1 is a schematic exploded perspective view of a mounting system with measurement of the weight of the occupant for a seat of a motor vehicle provided according to the present invention.

In FIG. 1, the reference number 1 designates a mounting system with measurement of the weight of the occupant for the seat (not illustrated) of a motor vehicle.

The mounting system comprises a bottom frame 2 rigidly connected to the bodywork C (illustrated in FIG. 3) of the motor vehicle by means of a plurality of bolts B, which are inserted into through holes H of the bottom frame 2 and are screwed into corresponding threaded holes made in the bodywork C. As will be described in greater detail hereinafter, the through holes H of the bottom frame 2 can be provided so as to make it possible to recover the constructional tolerances of the bodywork C.

The mounting system comprises a top frame 3, which supports the seat and is mounted in a floating way on the bottom frame 2 by means of interposition of four weight sensors 4, each of which is rigidly connected both to the bottom frame 2 and to the top frame 3.

The bottom frame 2 is made up of the union (typically by welding) of three metal sectional elements 5, which are arranged so as to constitute in plan view substantially an H shape. Each sectional element 5 has a channel-shaped cross section with the open end facing the top frame 3 and has a size such as to house with reduced play the weight sensors 4 inside it. According to a different embodiment (not illustrated), the bottom frame 2 is made up only of two metal sectional elements 5, which are arranged so that they are parallel to one another and are not directly connected to one another.

The top frame 3 is formed by joining (typically welding) three metal sectional elements 6, which are arranged so as to constitute in plan view substantially an H shape that copies the shape of the bottom frame 2; according to a preferred embodiment, each sectional element 6 has a box-shaped section.

According to a different embodiment (not illustrated), the bottom frame 2 is integrated in the bodywork C, and hence the weight sensors 4 are directly fixed to the bodywork C itself.

Figure 2:
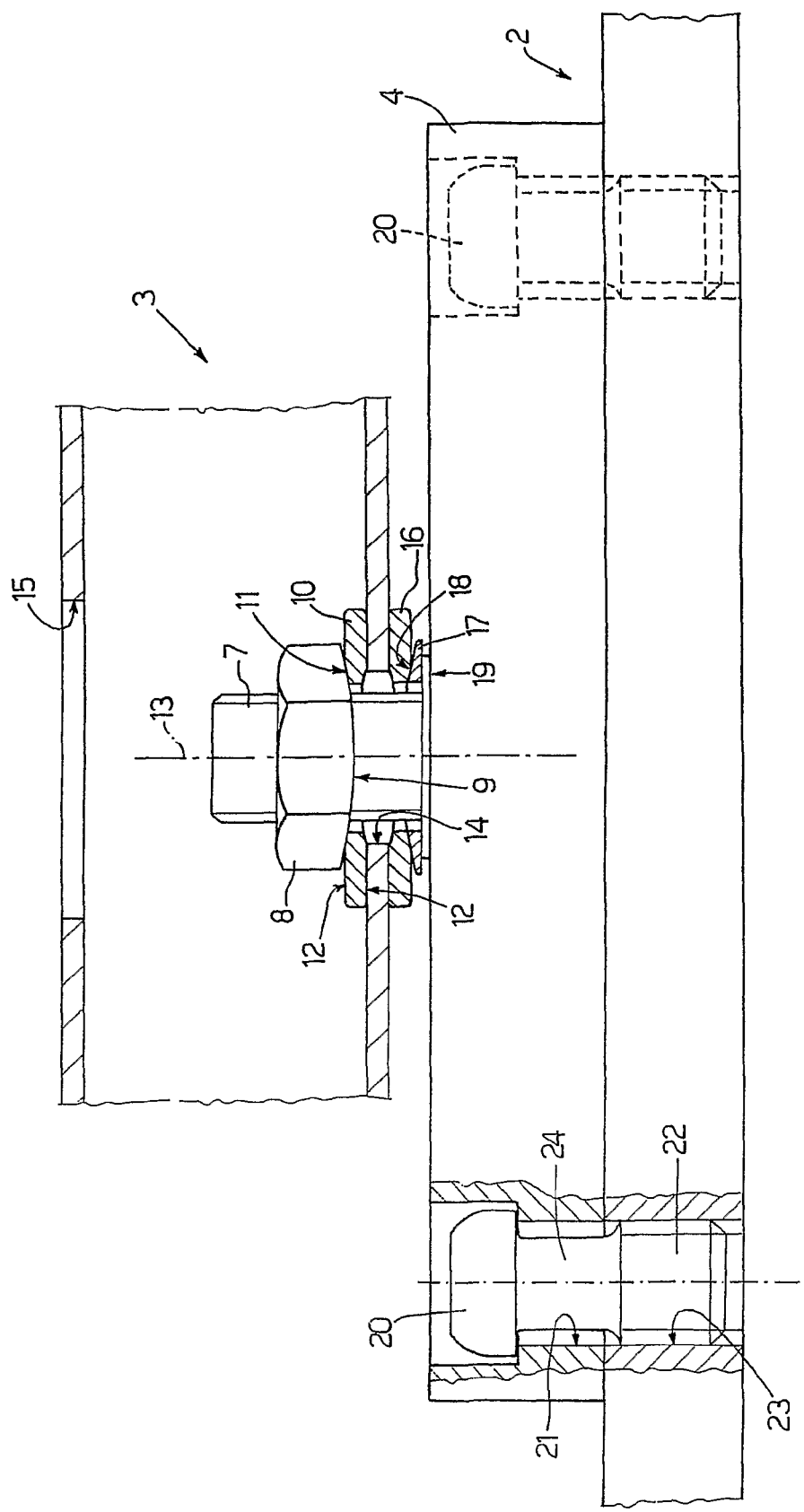
FIG. 2 is a partially cross-sectional view at an enlarged scale of a first detail of the mounting system of FIG. 1.

According to what is illustrated in FIGS. 1 and 2, each weight sensor 4 has a bolt 7, which is set vertically in a central position, is integrated in the weight sensor 4, and is used for connecting the weight sensor 4 itself to the top frame 3 by means of a respective nut 8. It should be emphasized that the bolt 7 is considered as being integrated in the weight sensor 4, both when the bolt 7 is permanently connected to the weight sensor 4 itself (for example, by welding or co-moulding) and when the bolt 7 is screwed into a purposely provided threaded hole of the weight sensor 4 itself.

A surface 9 of the nut 8 facing the weight sensor 4 has a convex spherical shape, and set between the nut 8 and the top frame 3 is a washer 10 having a spherical concave central surface 11, which reproduces in negative form the shape of the corresponding convex spherical surface 9 of the nut 8. In addition, the washer 10 has an outer surface 12, which is plane, has an annular shape, and is arranged so that it rests on the top frame 3.

According to a preferred embodiment, the washer 10 has a central axis 13 of symmetry and has a symmetrical shape specular with respect to a plane perpendicular to the central axis 13 of symmetry. Consequently, the washer 10 has a pair of concave spherical central surfaces 11, which are arranged on opposite sides of the washer 10 itself, and a pair of outer surfaces 12, which are plane and circumscribe the central surfaces 11.

In an area corresponding to each weight sensor 4, the top frame 3 has a bottom through hole 14, which is made through a bottom wall of the top frame 3 itself and is designed to receive the bolt 7 integrated in the weight sensor 4 itself. In the case of a type of top frame 3 constituted by sectional elements 6 having a box-shaped section, in a position corresponding to each weight sensor 4 the top frame 3 has also a top hole 15, which is set above and coaxial to the bottom hole 14 and is of a size such as to enable passage of the corresponding nut 8 and of a tool for screwing the nut 8 itself. According to what is illustrated in FIG. 1 with a solid line, the holes 14 (and hence the corresponding holes 15) have a symmetrical distribution. According to what is illustrated in FIG. 1 with a dashed line, the four holes 14 (and hence the corresponding holes 15) can present an asymmetrical distribution so as to adapt to particular constructional conformations of the bodywork C.

Set around each bolt 7 integrated in a weight sensor 4 and between the weight sensor 4 and the top frame 3 are a washer 16 and a washer 17. The washer 16 is identical to the washer 10 and hence has a pair of central surfaces 11 having a concave spherical shape. Instead, the washer 17 has a central surface 18 having a convex spherical shape which reproduces in negative form the shape of the corresponding spherical central surface 11 of the washer 16, and a plane surface 19 set in contact with the weight sensor 4.

Each weight sensor 4 is connected to the bottom frame 2 by means of a pair of bolts 20 inserted in two respective through holes 21 of the weight sensor 4 itself. According to a preferred embodiment, each bolt 20 presents a threaded terminal portion 22, which is arranged externally with respect to the through hole 21 and is screwed into a corresponding threaded hole 23 made in the bottom frame 2, and a non-threaded intermediate portion 24, which is arranged within the respective through hole 21 of the weight sensor 4 and has an external diameter smaller than the internal diameter of the through hole 21 itself. In particular, for each second bolt 20, the non-threaded intermediate portion 24 has an external diameter smaller than the external diameter of the corresponding threaded terminal portion 22.

Thanks to the fit between the convex spherical surface 9 of the nut 8 and the concave spherical complementary surface 11 of the washer 10 and thanks to the fit between the concave spherical surface 11 of the washer 16 and the convex spherical complementary surface 18 of the washer 17, it is possible to recover any possible angular errors on the verticality of the bolts 7 due to the inevitable constructional tolerances up to a maximum of approximately 2°. In other words, on the weight sensors 4 any possible preloadings due to incorrect angular positions present in the mounting system 1 are eliminated.

Figure 3:
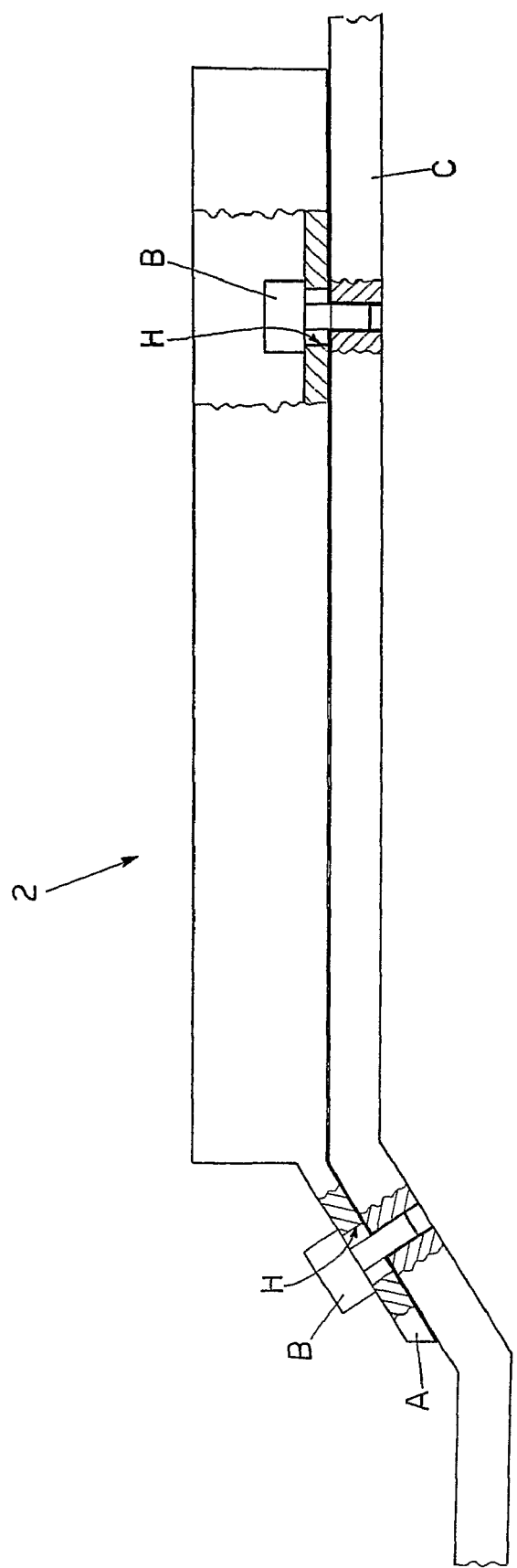
FIG. 3 is a partially cross-sectional view at an enlarged scale of a second detail of the mounting system of FIG. 1.

According to what is illustrated in FIG. 3, the through holes H of the bottom frame 2 have a diameter greater than the diameter of the threaded part of the bolts B. In this way, a certain adjustment of the position of the bottom frame 2 with respect to the bodywork C is possible to enable recovery of the constructional tolerances of the bodywork C itself in a horizontal plane.

In addition, according to a preferred embodiment, two holes H are made directly through a horizontal bottom wall of the bottom frame 2, whilst the other two holes H are made through two appendages A, which project downwards from the bottom frame 2 and form a certain angle of inclination with the horizontal bottom wall of the bottom frame 2 itself. Said constructional choice enables a recovery of the constructional tolerances of the bodywork C along a vertical axis without the use of shims, hence with an evident simplification in the installation.

It should be emphasized that the solutions described above for the recovery of the constructional tolerances of the bodywork C are necessary in so far as the normal machining of the bodywork C presents tolerances in the region of 6-8 mm, whilst the weight sensors 4 require tolerances in the region of 1-2 mm. Thanks to the solutions described above for recovery of the constructional tolerances of the bodywork C, it is not necessary to carry out precision machining on the bodywork C itself, with evident advantages in terms of saving in terms of time and costs.

Figure 4:
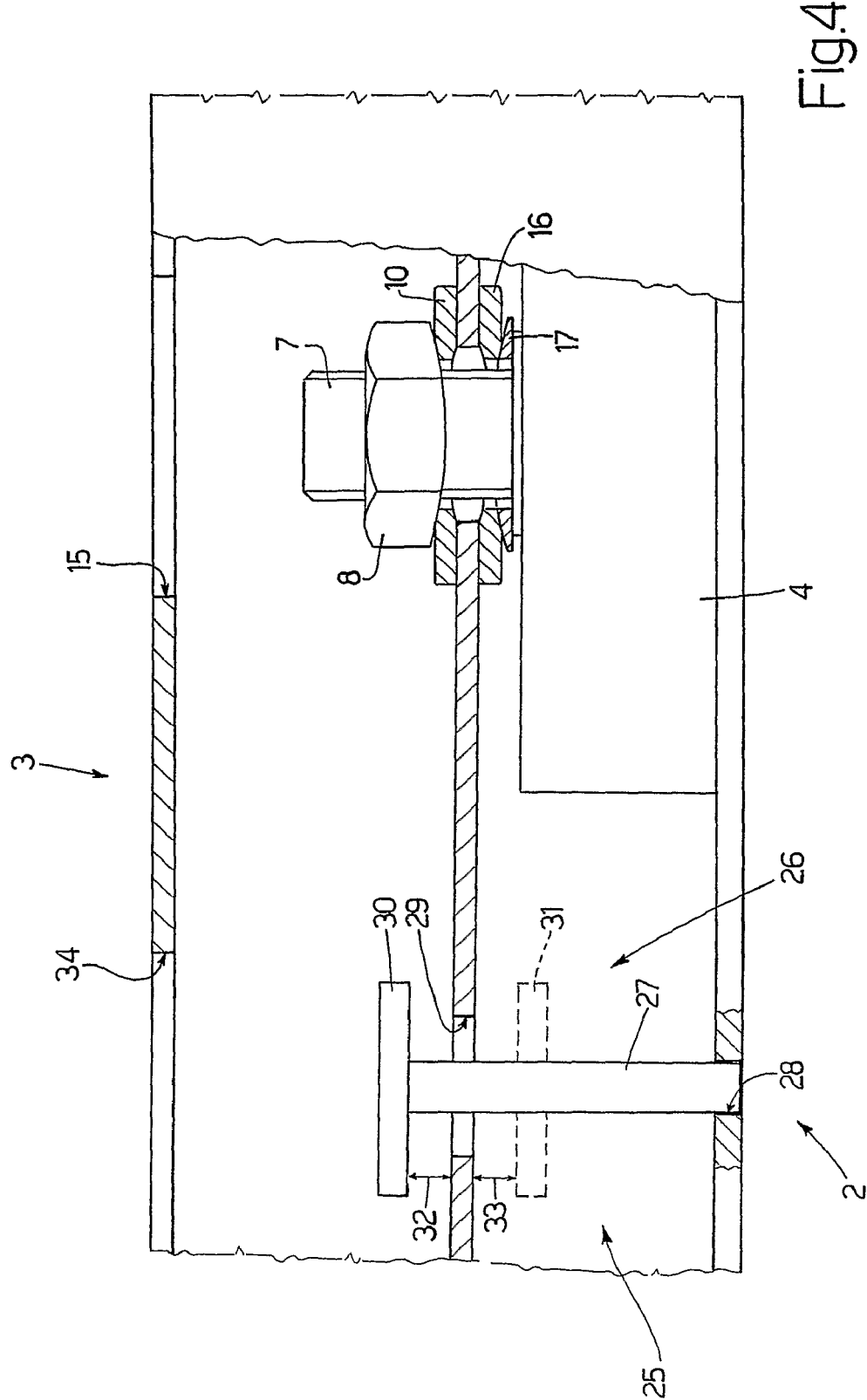
FIG. 4 is a partially cross-sectional view at an enlarged scale of a third detail of the mounting system of FIG. 1.

According to a preferred embodiment illustrated in FIG. 4, set in the proximity of at least one of the weight sensors 4 is a limiter 25, which has the function of limiting locally the relative displacement between the bottom frame 2 and the top frame 3 in a vertical direction, i.e., in a direction perpendicular to the planes of lie of the frames 2 and 3.

The limiter 25 comprises an element 26 (typically a bolt) having a thin central body 27, which has a bottom end rigidly connected to the bottom frame 2 (typically screwed into a purposely provided threaded hole 28 of the bottom frame 2) and a top end arranged through a hole 29 made through a bottom wall of the top frame 3. The hole 29 has a diameter greater than the diameter of the central body 27, in such a way that the central body 27 itself will be able to slide freely through the hole 29 without generation of any type of friction. The top end of the central body 27 terminates with a widened head, which defines a top contrast element 30 and has a diameter greater than the diameter of the hole 29. According to a possible embodiment illustrated with a dashed line in FIG. 4, screwed around the central body 27 is a washer, which defines a bottom contrast element 31, has a diameter greater than the diameter of the hole 29, and is arranged between the bottom frame 2 and the top frame 3 in the proximity of the hole 29.

It is evident that the top frame 3 is free to perform a minor vertical displacement with respect to the bottom frame 2 both upwards and downwards. In particular, the amount of said displacements is determined, in one direction, by the distance 32 existing between the top contrast element 30 and the top frame 3 and, in the opposite direction, by the distance 33 existing between the bottom contrast element 31 and the top frame 3.

According to a preferred embodiment illustrated in FIG. 4, in a position corresponding to each limiter 25 the top frame 3 has the through hole 29 made through a bottom wall of the top frame 3 itself and an overlying top hole 34, which is coaxial to the bottom hole 29 and is of a size such as to enable passage of the head of the bolt 26.

The presence of the limiter 25 in the proximity of a weight sensor 4 does not interfere in any way with correct operation of the weight sensor 4 itself in so far as during normal operation of the weight sensor 4 only very contained vertical displacements occur between the top frame 3 and the bottom frame 2.

In addition, the presence of the limiter 25 makes it possible to prevent, in the case of exceptional events (typically, front impact of the vehicle), the weight sensor 4 from being subjected to excessive stresses, which could lead to the destruction of the weight sensor 4 itself. It should be noted that destruction of the weight sensor 4 can be very dangerous for the passenger sitting in the seat in so far as the destruction of one or more weight sensors 4 can entail an anomalous displacement of the top frame 3 (and hence of the seat supported by the top frame 3) with respect to the bottom frame 2 (and hence with respect to the bodywork C rigidly connected to the bottom frame 2). In other words, when between the top frame 3 and the bottom frame 2 a tensile/compressive force is generated of exceptional intensity, said force is initially absorbed by the weight sensor 4, which undergoes deformation until it reaches the limits imposed by the limiter 25. At this point, the tensile/compressive force of exceptional intensity is discharged through the limiter 25 and does not damage the weight sensor 4.

It is evident that a single limiter 25 can be inserted in a position corresponding to the weight sensor 4, which undergoes the higher stresses in the event of head-on impact of the vehicle, or else a number of limiters 25 can be inserted. The choice of the number and location of the limiters 25 (possibly two limiters 25 can be associated to one and the same weight sensor 4) depends only upon how much it is intended to limit the maximum force to which the various weight sensors 4 are subjected in limit conditions. It should be noted that the use of the limiters 25 enables use of weight sensors 4 that have a mechanical resistance to extraordinary stresses that is relatively low and hence also a contained cost.

FIGS. 5-8 illustrate two further embodiments of a weight sensor 4 that can be used in the mounting system 1 described above.

Figure 5:
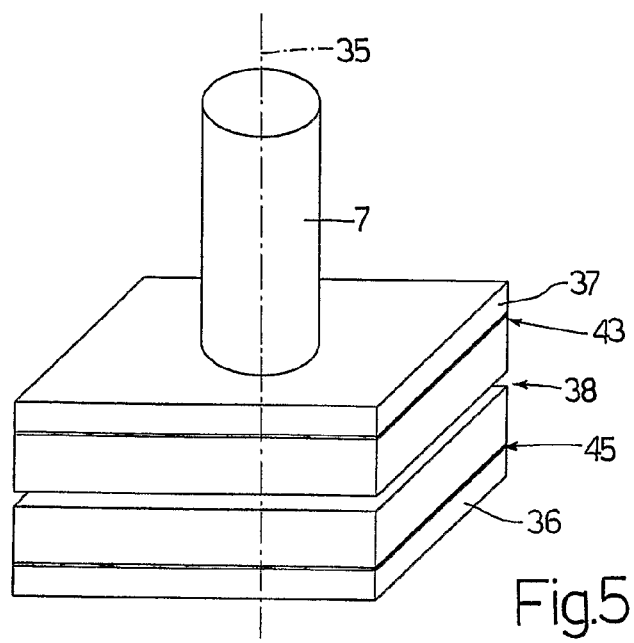
FIG. 5 is a schematic perspective view of a different embodiment of a weight sensor of the mounting system of FIG. 1.
Figure 6:
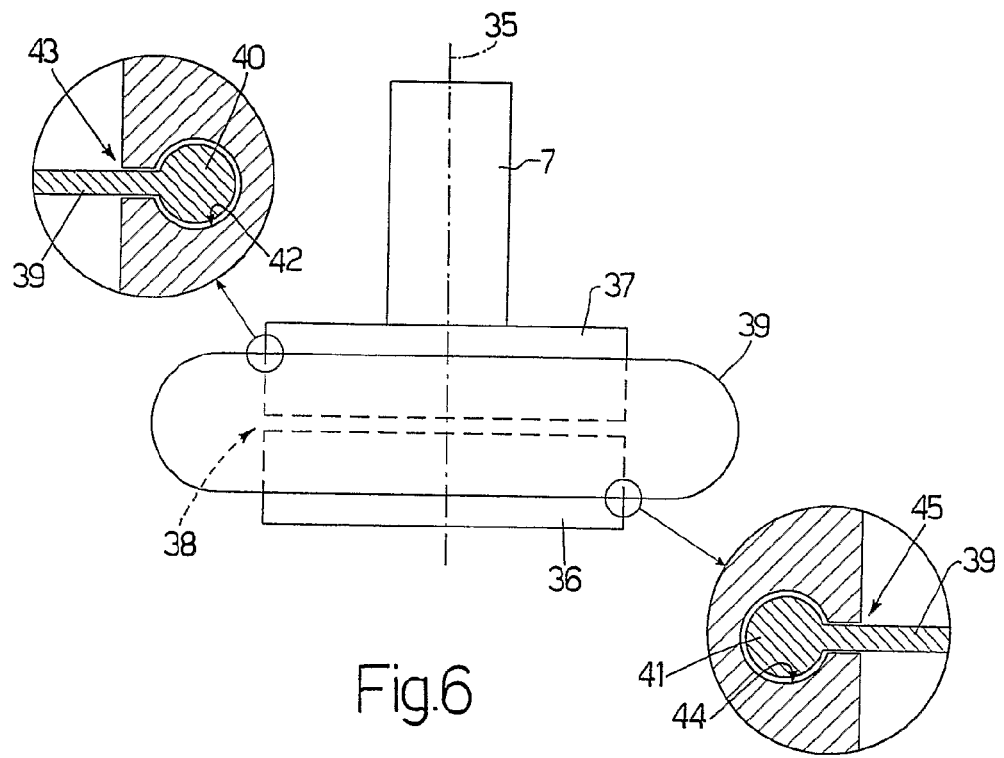
FIG. 6 is a schematic cross-sectional side view of the weight sensor of FIG. 5.

FIGS. 5 and 6 illustrate a weight sensor 4, which has a symmetry about a central axis 35, which also defines a direction of measurement of the weight. Said weight sensor 4 comprises a bottom element 36 and a top element 37 with respect to the direction 35 of measurement of the weight. Constrained to the top element 37 is the bolt 7, which is used for connecting the weight sensor 4 to the top frame 3 by means of the respective nut 8.

The two elements 36 and 37 are floating with respect to one another in the direction 35 of measurement of the weight and are slightly set at a distance from one another in said direction 35 of measurement of the weight so as to define between them a gap 38. The gap 38 extends along a plane of lie orthogonal to the direction 35 of measurement of the weight and has a thickness that in use can vary as a result of the forces applied to the weight sensor 4 in the direction 35 of measurement of the weight. In other words, the greater the compressive force applied to the weight sensor 4 in the direction 35 of measurement of the weight, the smaller the thickness of the gap 38. The presence of the gap 38 is necessary in so far as set between the bottom element 36 and the top element 37 is a load cell (not illustrated in detail), which in use must be free to deform without any obstacle in the direction 35 of measurement of the weight to be able to carry out a correct measurement.

In order to shield the gap 38 against any possible intrusion of foreign bodies (typically dust) that could affect the precision of measurement of the weight, a flexible shielding body 39 is provided (illustrated only in FIG. 6), which has an annular shape, covers externally the gap 38, and has a bottom edge 40 fixed to the bottom element 36 and a top edge 41 fixed to the top element 37. By way of example, the flexible shielding body 39 can be made of rubber or the like so as to require for its own deformation forces of a negligible intensity as compared to the intensity of the force measured by the weight sensor 4. In other words, the flexible shielding body 39 is able to undergo deformation to accompany the variation in thickness of the gap 38 without there being exerted, between the bottom element 36 and the top element 37, any significant elastic forces for the purposes of correctness of measurement of the weight.

In particular, the bottom edge 40 of the shielding body 39 has a swelling and is force fitted into a groove 42, which is made along the outer wall of the bottom element 36 and has an opening 43 of dimensions smaller than the dimensions of the bottom edge 40. Likewise, the top edge 41 of the shielding body 39 has a swelling and is force fitted into a groove 44, which is made along the outer wall of the top element 37 and has an opening 45 of dimensions smaller than the dimensions of the top edge 41.

According to a different embodiment (not illustrated), the shielding body 39 is partially rigid and has a rigid central portion arranged between two flexible side portions, which have the bottom edge 40 and the top edge 41.

According to a different embodiment (not illustrated), the shielding body 39 is rigid, covers externally the gap 38, is rigidly connected to one of the elements 36 and 37, and is separate from the other element 37 or 36 so as not to present any point of contact with the other element 37 or 36 itself. In other words, the rigid shielding body 39 is rigidly connected to the top element 37 and is separate from the bottom element 36, or else the rigid shielding body 39 is rigidly connected to the bottom element 36, and is separate from the top element 37. It should be emphasized that the rigid shielding body 39 must be connected to just one of the elements 36 and 37 and must hence be physically separate from the other element 37 or 36 to prevent it from affecting the measurement of the weight performed by the weight sensor 4.

Figure 7:
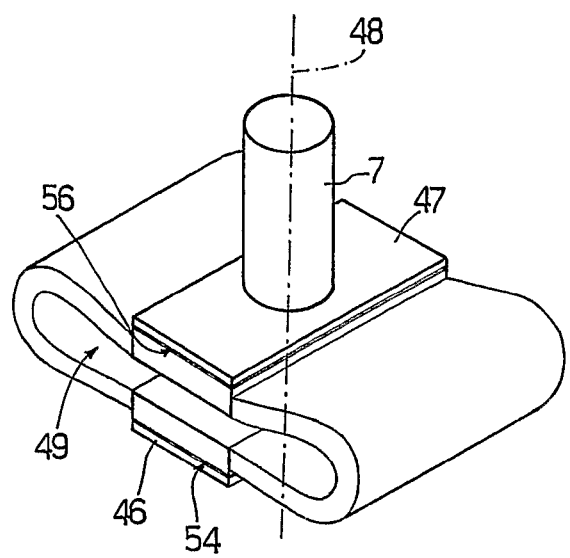
FIG. 7 is a schematic perspective view of a further embodiment of a weight sensor of the mounting system of FIG. 1.
Figure 8:
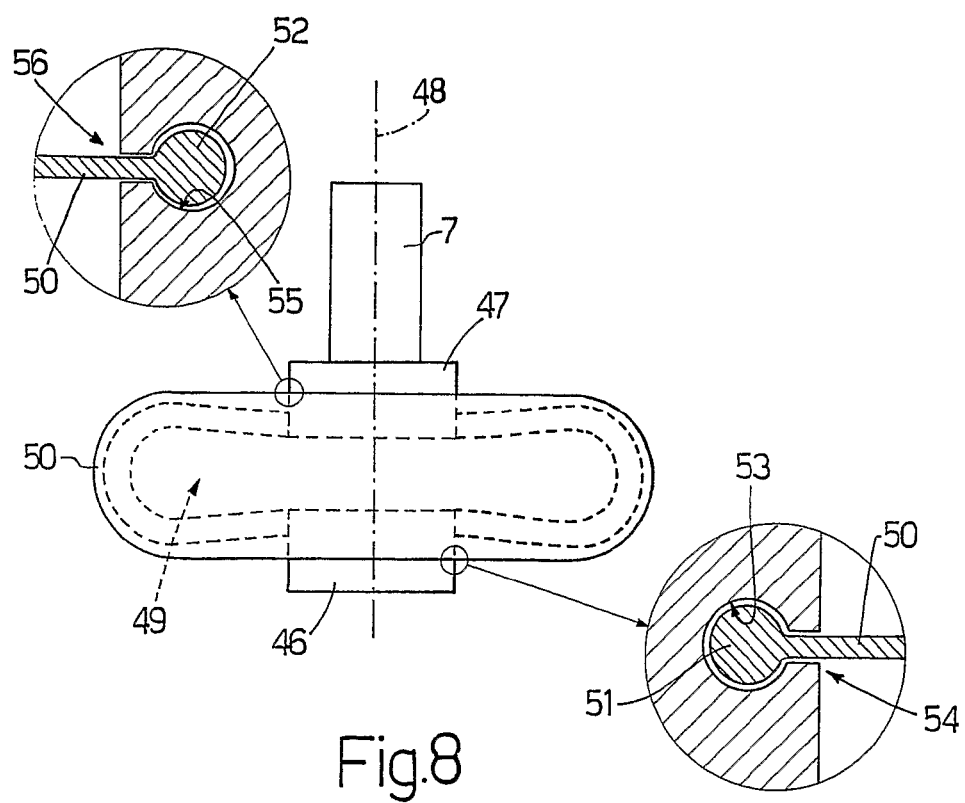
FIG. 8 is a schematic side view of the weight sensor of FIG. 7.

FIGS. 7 and 8 illustrate a weight sensor 4, which comprises a bottom element 46 and a top element 47 with respect to a direction 48 of measurement of the weight. The two elements 46 and 47 are floating with respect to one another in a direction 48 of measurement of the weight and are slightly set at a distance from one another in the direction 48 of measurement of the weight itself so as to define between them a gap 49.

The gap 49 extends along a plane of lie orthogonal to the direction 48 of measurement of the weight and has a thickness that in use is variable as a result of the forces applied to the weight sensor 4 in the direction 48 of measurement of the weight. In other words, the greater the compressive force applied to the weight sensor 4 in the direction 48 of measurement of the weight, the smaller the thickness of the gap 49. The presence of the gap 49 is necessary, in so far as arranged between the bottom element 46 and the top element 47 is a load cell (not illustrated in detail), which in use must be free to deform without any obstacle in the direction 48 of measurement of the weight to be able to carry out a correct measurement.

In order to shield the gap 49 against any possible intrusion of foreign bodies (typically dust) that could affect the precision of measurement of the weight, a flexible shielding body 50 is provided (illustrated only in FIG. 8), which has an annular shape, covers externally the gap 49, and has a bottom edge 51 fixed to the bottom element 46 and a top edge 52 fixed to the top element 47. By way of example, the flexible shielding body 50 may be made of rubber or the like so as to require for its own deformation forces of negligible intensity as compared to the intensity of the force measured by the weight sensor 4. In other words, the flexible shielding body 50 can undergo deformation to accompany the variation of thickness of the gap 49, without there being exerted, between the bottom element 46 and the top element 47, any significant elastic forces for the purposes of correctness of the measurement of the weight.

In particular, the bottom edge 51 of the shielding body 50 has a swelling and is force fitted into a groove 53, which is made along the outer wall of the bottom element 46 and has an opening 54 of dimensions smaller than the dimensions of the bottom edge 51. Likewise, the top edge 52 of the shielding body 50 has a swelling and is force fitted into a groove 55, which is made along the outer wall of the top element 47 and has an opening 56 of dimensions smaller than the dimensions of the top edge 52.

According to a different embodiment (not illustrated), the shielding body 50 is partially rigid and has a rigid central portion arranged between two flexible side portions, which present the bottom edge 51 and the top edge 52.

According to a different embodiment (not illustrated), the shielding body 50 is rigid, covers externally the gap 49, is rigidly connected to one of the elements 46 and 47, and is separate from the other element 47 or 46 so as not to present any point of contact with the other element 47 or 46 itself. In other words, the rigid shielding body 50 is rigidly connected to the top element 47 and is separate from the bottom element 46, or else the rigid shielding body 50 is rigidly connected to the bottom element 46 and is separate from the top element 47. It should be emphasized that the rigid shielding body 50 must be connected to just one of the elements 46 and 47 and must hence be physically separate from the other element 47 or 46 to prevent it from affecting the measurement of the weight performed by the weight sensor 4.

The invention claimed is:

1. A mounting system with measurement of the weight of the occupant for a seat of a motor vehicle; the mounting system comprising:
    a bottom frame carried by the bodywork of the motor vehicle;
    a top frame, which supports the seat and is mounted in a floating way on the bottom frame;
    a plurality of weight sensors, each of which is set between the bottom frame and the top frame and is connected to the bottom frame or to the top frame by means of a single first bolt locked by a nut; wherein a surface of the nut facing the weight sensor has a spherical shape and set between the nut and the frame is a first washer having a spherical central surface which reproduces in negative form the shape of the corresponding spherical surface of the nut; each first bolt being integrated in the respective weight sensor; and set in the proximity of at least one of the weight sensors is at least one limiter, which limits the relative local displacement between the bottom frame and the top frame in a vertical direction.

2. The mounting system (1) according to claim 1, wherein the surface (9) of the nut (8) facing the weight sensor (4) has a convex spherical shape and the spherical central surface (11) of the first washer (10) has a concave spherical shape.

3. The mounting system (1) according to claim 1, wherein the first washer (10) has a central axis (13) of symmetry and has a symmetrical shape specular with respect to a plane perpendicular to the central axis (13) of symmetry.

4. The mounting system (1) according to claim 1, wherein: set around each first bolt (7) integrated in a weight sensor (4) and between the weight sensor (4) and the frame (3; 2) are a second washer (16) and a third washer (17); the second washer (16) has a central surface (11) with a spherical shape; and the third washer (17) has a central surface (18) with a spherical shape which reproduces in negative form the shape of the corresponding spherical surface (11) of the second washer (16).

5. The mounting system (1) according to claim 4, wherein the second washer (16) is identical to the first washer (10).

6. The mounting system (1) according to claim 4, wherein the spherical central surface (11) of the second washer (16) has a convex spherical shape, and the spherical central surface (18) of the third washer (17) has a concave spherical shape.

7. The mounting system (1) according to claim 1, wherein each weight sensor (4) is connected to the bottom frame (2) or to the top frame (3) by means of the single first bolt (7) integrated in the weight sensor (4) and is connected to the top frame (3) or to the bottom frame (2) by means of a pair of second bolts (20) inserted in two respective through holes (21) of the weight sensor (4) itself.

8. The mounting system (1) according to claim 7, wherein each weight sensor (4) is connected to the top frame (3) by means of the single first bolt (7) and is connected to the bottom frame (2) by means of the pair of second bolts (20).

9. The mounting system (1) according to claim 7, wherein each second bolt (20) presents a threaded terminal portion (22), which is arranged externally with respect to the respective through hole (21), and a non-threaded intermediate portion (24), which is arranged within the respective through hole (21) of the weight sensor (4) and has an external diameter smaller than the internal diameter of the through hole (21) itself.

10. The mounting system (1) according to claim 9, wherein for each second bolt (20) the non-threaded intermediate portion (24) has an external diameter smaller than the external diameter of the corresponding threaded terminal portion (22).

11. The mounting system (1) according to claim 1, wherein each first bolt (7) is permanently connected to the respective weight sensor (4).

12. The mounting system (1) according to claim 1, wherein each first bolt (7) is screwed to the respective weight sensor.

13. The mounting system (1) according to claim 1, wherein the bottom frame (2) is made up of at least two sectional elements (5), each of which has a channel-shaped cross section with the open end facing the top frame (3) and has a size such as to house with reduced play the weight sensors (4) inside it.

14. The mounting system (1) according to claim 1, wherein: the top frame (3) is made up by joining a number of sectional elements (6), each of which has a box-shaped section; in a position corresponding to each weight sensor (4) the top frame (3) has a bottom through hole (14) designed to receive the first bolt (7) integrated in the weight sensor (4) and an overlying top hole (15), which is coaxial to the bottom hole (14) and is of a size such as to enable passage of the corresponding nut (8) and of a tool for screwing the nut (8) itself.

15. The mounting system (1) according to claim 1, wherein: the bottom frame (2) is rigidly connected to the bodywork (C) by means of a plurality of bolts (B), which are inserted in through holes (H) made in the bottom frame (2) and are screwed in corresponding threaded holes made in the bodywork (C); and the through holes (H) of the bottom frame (2) have a diameter greater than the diameter of the threaded part of the bolts (B).

16. The mounting system (1) according to claim 15, wherein two holes (H) are made directly through a horizontal bottom wall of the bottom frame (2) and two holes (H) are made through two appendages (A), which project downwards from the bottom frame (2) and form a certain angle of inclination with the horizontal bottom wall of the bottom frame (2) itself.

17. The mounting system (1) according to claim 1, wherein set in the proximity of at least one of the weight sensors (4) is at least one limiter (25), which has the function of limiting locally the relative displacement between the bottom frame (2) and the top frame (3) in a vertical direction.

18. The mounting system (1) according to claim 1, wherein set in the proximity of each weight sensor (4) is at least one limiter (25).

19. The mounting system (1) according to claim 17, wherein the limiter (25) comprises an element (26) having a thin central body (27), which has a bottom end rigidly connected to the bottom frame (2) and a top end, which is set through a through hole (29) made in a bottom wall of the top frame (3) and terminates with a widened head; the through hole (29) made through a bottom wall of the top frame (3) has a diameter greater than the diameter of the central body (27) and smaller than the diameter of the widened head.

20. The mounting system (1) according to claim 19, wherein a washer, which has a diameter greater than the diameter of the through hole (29) made through a bottom wall of the top frame (3), is set around the central body (27) and is set between the bottom frame (2) and the top frame (3) in the proximity of the hole (29) itself.

21. The mounting system (1) according to claim 1, wherein each weight sensor (4) comprises: a bottom element (36; 46) and a top element (37; 47) with respect to a direction (35; 48) of measurement of the weight; the two elements (36, 37; 46, 47) floating with respect to one another in the direction (35; 48) of measurement of the weight and being slightly set at a distance from one another in the direction (35; 48) of measurement of the weight itself so as to define between them a gap (38; 49); and a shielding body (39; 50), which is fixed to at least one of the elements (36, 37; 46, 47) and externally covers the gap (38; 49).

22. The mounting system (1) according to claim 21, wherein the shielding body (39; 50) is at least partially flexible, has an annular shape, and is fixed both to the bottom element (36; 46) and to the top element (37; 47).

23. The mounting system (1) according to claim 22, wherein: the shielding body (39; 50) has a bottom edge (40; 51) fixed to the bottom element (36; 46) and a top edge (41; 52) fixed to the top element (37; 47); the bottom edge (40; 51) of the shielding body (39; 50) has a swelling and is force fitted into a groove (42; 53), which is made along the outer wall of the bottom element (36; 46) and has an opening (43; 54) of dimensions smaller than the dimensions of the bottom edge (40; 51); and the top edge (41; 52) of the shielding body (39; 50) has a swelling and is force fitted into a groove (44; 55), which is made along the outer wall of the top element (37; 47) and has an opening (45; 56) of dimensions smaller than the dimensions of the top edge (41; 52).

24. The mounting system (1) according to claim 21, wherein the shielding body (39; 50) is rigid, is fixed to just one of the elements (36, 37; 46, 47) and is separate from the other element (37, 36; 47, 46) so as not to present any point of contact with the other element (37, 36; 47, 46) itself.

25. The mounting system (1) according to claim 24, wherein the shielding body (39; 50) is rigidly connected to the top element (37; 47) and is separate from the bottom element (36; 46).

26. The mounting system (1) according to claim 24, wherein the shielding body (39; 50) is rigidly connected to the bottom element (36; 46) and is separate from the top element (37; 47).

27. A mounting system (1) with measurement of the weight of the occupant for a seat of a motor vehicle; the mounting system (1) comprising: a bottom frame (2) carried by the bodywork (C) of the motor vehicle; a top frame (3), which supports the seat and mounted in a floating way on the bottom frame (2); and a plurality of weight sensors (4), each of which is set between the bottom frame (2) and the top frame (3) and is connected to the bottom frame (2) or to the top frame (3) by means of a single first bolt (7) that is locked by a nut (8) and is integrated in the respective weight sensor (4);

wherein set in the proximity of at least one of the weight sensors (4) is at least one limiter (25), which has the function of limiting locally the relative displacement between the bottom frame (2) and the top frame (3) in a vertical direction.

28. The mounting system (1) according to claim 27, wherein set in the proximity of each weight sensor (4) is at least one limiter (25).

29. The mounting system (1) according to claim 27, wherein: the limiter (25) comprises an element (26) having a thin central body (27), which has a bottom end rigidly connected to the bottom frame (2) and a top end, which is arranged through a through hole (29) made through a bottom wall of the top frame (3) and terminates with a widened head; and the through hole (29) made through a bottom wall of the top frame (3) has a diameter greater than the diameter of the central body (27) and smaller than the diameter of the widened head.

30. The mounting system (1) according to claim 29, wherein a washer, which has a diameter greater than the diameter of the through hole (29) made through a bottom wall of the top frame (3), is set around the central body (27) and is set between the bottom frame (2) and the top frame (3) in the proximity of the hole (29) itself.

* * * * *